(12) United States Patent
Geyer et al.

(10) Patent No.: US 8,002,347 B2
(45) Date of Patent: *Aug. 23, 2011

(54) CYCLE SEAT WITH ADJUSTABLE SIDES

(76) Inventors: James B. Geyer, Phoenix, MD (US);
Thomas C. Geyer, Monroe, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/659,937

(22) Filed: Mar. 25, 2010

(65) Prior Publication Data

US 2010/0187873 A1 Jul. 29, 2010

Related U.S. Application Data

(63) Continuation-in-part of application No. 12/285,319, filed on Oct. 1, 2008, now Pat. No. 7,703,846.

(60) Provisional application No. 60/960,979, filed on Oct. 23, 2007.

(51) Int. Cl.
*B62J 1/00* (2006.01)
(52) U.S. Cl. .................... 297/201; 297/195.1; 297/284.9
(58) Field of Classification Search ............... 297/284.9, 297/195.1, 201; 280/220, 226.1, 288.4
See application file for complete search history.

(56) References Cited

U.S. PATENT DOCUMENTS

| | | | | |
|---|---|---|---|---|
| 694,875 A | * | 3/1902 | Meighan | 297/201 |
| 4,089,559 A | * | 5/1978 | Prange et al. | 297/201 |
| 4,776,632 A | * | 10/1988 | Akimori et al. | 297/284.9 |
| 4,925,203 A | | 5/1990 | Buckler | |
| 5,167,435 A | * | 12/1992 | Aldi | 297/201 |
| 5,284,354 A | | 2/1994 | McWethy | |
| 5,725,227 A | | 3/1998 | Mayer | |
| 6,139,039 A | | 10/2000 | Becker | |
| 6,142,562 A | * | 11/2000 | Varan | 297/201 |
| 6,209,954 B1 | * | 4/2001 | Bombardier | 297/201 |
| 6,270,065 B1 | * | 8/2001 | Hals | 267/132 |
| 6,290,291 B1 | * | 9/2001 | Kojima | 297/201 |
| 6,382,651 B1 | * | 5/2002 | Enda | 280/288.4 |
| 6,503,019 B1 | | 1/2003 | Wang | |

(Continued)

FOREIGN PATENT DOCUMENTS

DE 4403706 8/1995

(Continued)

OTHER PUBLICATIONS

Website, www.maverickbike.com, "Speedball"™ height adjustable seatpost, two pages printed from the internet on Nov. 7, 2008.

(Continued)

*Primary Examiner* — Sarah B McPartlin
(74) *Attorney, Agent, or Firm* — Richard C. Litman

(57) ABSTRACT

The cycle seat with adjustable sides includes laterally adjustable side wings for increased rider stability. The seat is mounted on arcuately articulating arms that pivot from the lower forward frame of the cycle. The arms are biased upwardly by a spring, thus urging the seat into contact with the rider. A latch mechanism allows the rider to latch the seat position in a lower range for normal riding, or to latch the seat in a higher range to support the rider as he or she stands on the pedals to exert greater force during acceleration or uphill riding. The greater support provided by the raised seat and articulating support mechanism during such riding greatly reduces the amount of upper body exertion the rider would otherwise need to stabilize him or herself using the cycle handlebars, thus freeing the rider to exert greater pedal force during such extreme cycling operations.

16 Claims, 13 Drawing Sheets

U.S. PATENT DOCUMENTS

| | | |
|---|---|---|
| 6,575,529 B1 * | 6/2003 | Yu .................................. 297/201 |
| 6,799,771 B2 | 10/2004 | Bigot |
| D536,645 S | 2/2007 | Cole |
| 7,261,310 B2 | 8/2007 | Yifrah et al. |
| 7,494,181 B2 * | 2/2009 | Tucker ........................... 297/201 |
| 2001/0008348 A1 * | 7/2001 | Nelson ....................... 297/195.1 |
| 2002/0004439 A1 | 1/2002 | Galbraith et al. |
| 2006/0273543 A1 | 12/2006 | Jong et al. |
| 2008/0219755 A1 | 9/2008 | Meguerditchian |
| 2008/0246249 A1 | 10/2008 | Pokrywka |
| 2008/0258427 A1 | 10/2008 | Buckley |

FOREIGN PATENT DOCUMENTS

| | | |
|---|---|---|
| DE | 10253575 | 5/2004 |
| EP | 0501385 | 9/1992 |
| WO | WO 2004/007270 | 1/2004 |

OTHER PUBLICATIONS

Website, http://www.nashbar.com/results.cfm?category=6000114&subcategory=60001082&storetype=&estoreid=&init=y&pagename=Category%3A%20Saddles, series of bicycle seats or saddles, eight pages printed from the internet on Nov. 7, 2008

* cited by examiner

CYCLE SEAT WITH ADJUSTABLE SIDES

CROSS REFERENCE TO RELATED PATENT APPLICATION

This application is a continuation-in-part of U.S. patent application Ser. No. 12/285,319 filed Oct. 1, 2008, now U.S. Pat. No. 7,703,846, which application claims the benefit of U.S. Provisional Patent Application Ser. No. 60/960,979 filed Oct. 23, 2007.

BACKGROUND OF THE INVENTION

1. Field of the Invention

The present invention relates generally to seating devices for bicycles and other pedal powered cycles. More specifically, the present invention comprises various embodiments of a cycle seat having laterally adjustable side panels or wings, which provide lateral support for the hips and upper thighs of the rider. The cycle seat per se may be installed upon a cycle, or may be installed in combination with other seat adjustment mechanisms, as desired.

2. Description of the Related Art

Cycle seats, particularly for relatively unstable vehicles such as bicycles and unicycles, must provide reasonable security for the cyclist while also providing the cyclist with leverage for maneuvering the cycle. This has been accomplished conventionally by means of a relatively small seating surface with a forwardly extending pommel that fits between the upper thighs of the cyclist, enabling the cyclist to brace against the pommel to a certain extent while pedaling and/or maneuvering. The forwardly extending central pommel has its disadvantages, however, with perhaps the chief disadvantage being the pressure applied to the perineal area of the cyclist during certain riding conditions.

As a result, a number of cycle seat configurations have been developed which greatly reduce or eliminate the forwardly extending central pommel. Most such seats provide some other means for the cyclist to stabilize himself or herself on the cycle, e.g., by means of generally vertical, laterally disposed side panels or wings extending upwardly from the opposite left and right edges of the seat. Such laterally disposed wings can be of some assistance in providing better control for the rider, but this is generally true only under a relatively narrow set of conditions. For example, when the cyclist stands on the pedals for greater leverage when accelerating or hill climbing, he or she must perform all other control functions with the arms, as there is no seat contact. Even in the case of an articulating seat, the seat must contact different parts of the cyclist's body at different times, i.e., the hips when the rider is standing on the pedals during hard pedaling operations, with contact reverting to the upper thighs when the cyclist is seated upon the seat. Moreover, a seat with fixed lateral side members or wings cannot possibly fit all cyclists; some form of adjustment is required, and such adjustment should be achievable by the cyclist while actually cycling, as the cyclist adjusts his or her position relative to the seat during different cycling conditions.

The present inventors are aware of a number of adjustable cycle seating configurations that have been developed in the past. An example is found in German Patent No. 4,403,706, published on Aug. 10, 1995. This reference describes (according to the drawings and English abstract) a relatively long or tall seat for a recumbent bicycle. The seat comprises a thin and somewhat form-fitting semi-rigid shell. Limited adjustment is provided for the back and/or seat angle by means of the slight flexibility of the seat.

Another example is found in German Patent No. 10,253,575, published on May 13, 2004. This publication describes (according to the drawings and English abstract) a bicycle having a longitudinally and vertically adjustable seat by means of a pivotally mounted seat post structure and a turnbuckle link having an adjustable length. The seat configuration per se is only generally indicated.

None of the above inventions and patents, taken either singly or in combination, is seen to describe the instant invention as claimed. Thus, a cycle seat with adjustable sides solving the aforementioned problems is desired.

SUMMARY OF THE INVENTION

The cycle seat with adjustable sides includes a base plate having at least one, and preferably two, laterally disposed wing adjustment guide plates thereon, i.e., a forward and a rearward guide plate in the case of a double mechanism. Each guide plate includes two tracks for corresponding laterally adjustable arms, with each arm having a generally vertical wing at its distal end. Each pair of arms, i.e., the two arms of the front guide plate and the two arms of the rear guide plate, includes a pinion gear therebetween, thus requiring the two corresponding arms to adjust outwardly and inwardly simultaneously and equally relative to one another. A latch mechanism is provided for each guide plate and corresponding left and right arm assembly, with the latch mechanisms being adjustable by the cyclist while operating the cycle. A seat is immovably affixed atop the base plate, with the wing adjustment mechanism and inner portions of the arms being captured between the seat and the underlying base plate.

The above-described seat assembly may be installed per se upon a bicycle, unicycle, tricycle, or other pedal powered vehicle. Other embodiments provide for the longitudinal and/or articulating adjustment of the cycle seat, in accordance with additional mechanism.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a cycle seat having laterally adjustable sides and other adjustment means. The cycle seat provides lateral bracing or support for the thighs and/or hips of a cyclist, thereby reducing the need for a seat pommel between the upper thighs of the cyclist. The seat may be mounted directly upon the seat post of the cycle, or upon additional adjustment mechanism(s) for further seat adjustment, as desired.

Figure 1:
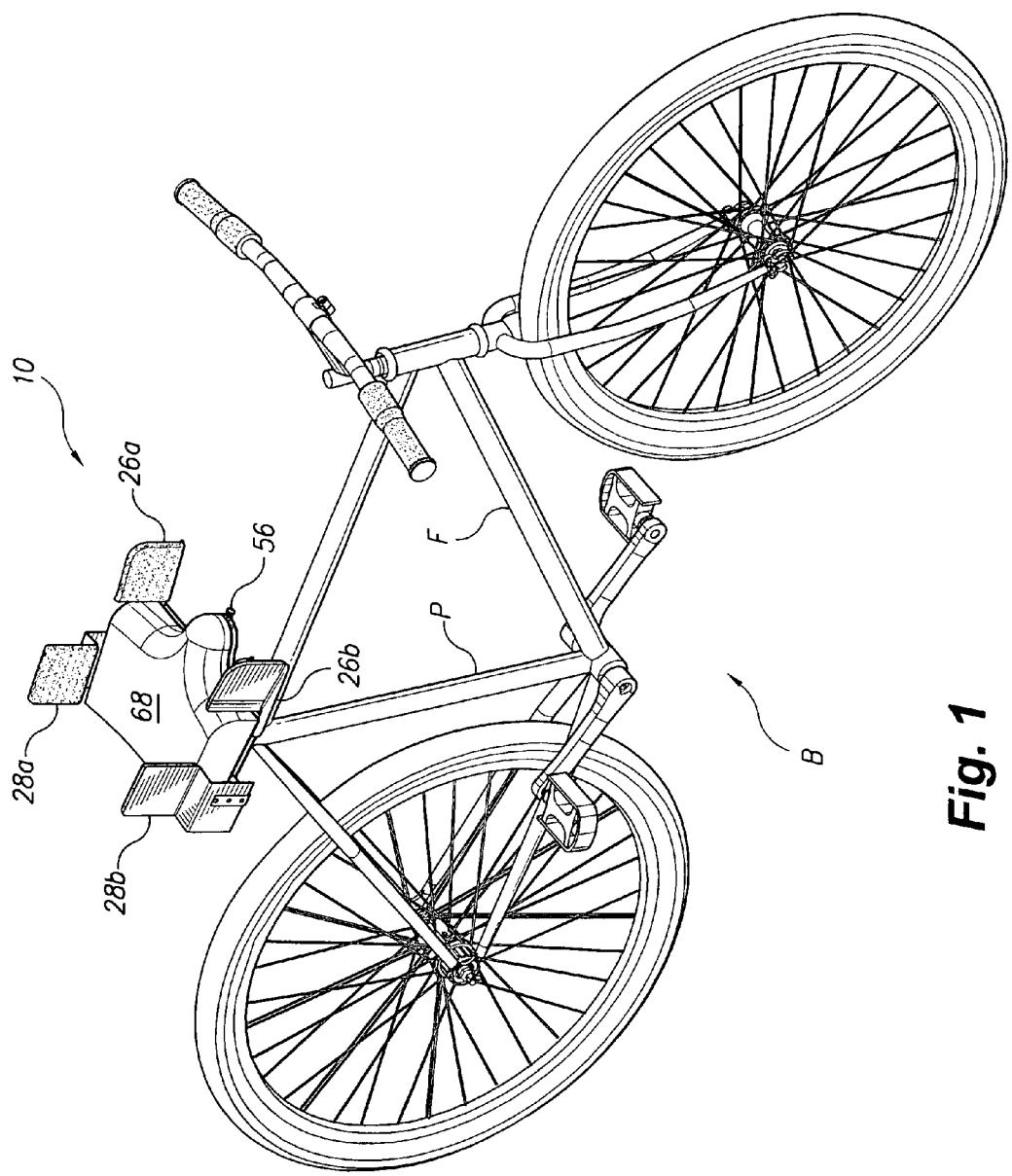
FIG. 1 is an environmental, perspective view of a cycle seat with adjustable sides according to the present invention, installed upon a bicycle.
Figure 2:
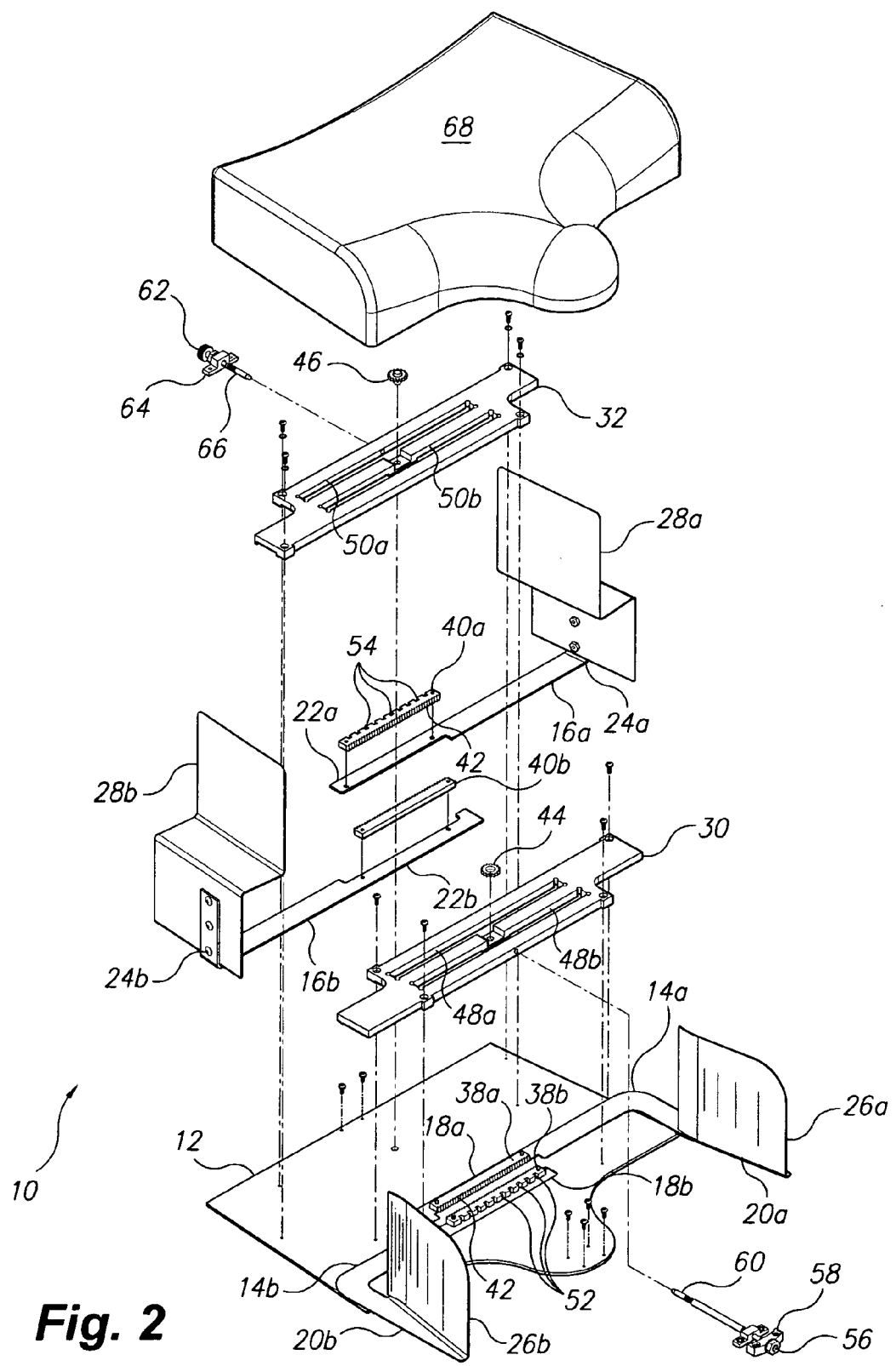
FIG. 2 is an exploded perspective view of the cycle seat of FIG. 1, illustrating its various components and their relationships with one another.
Figure 3:
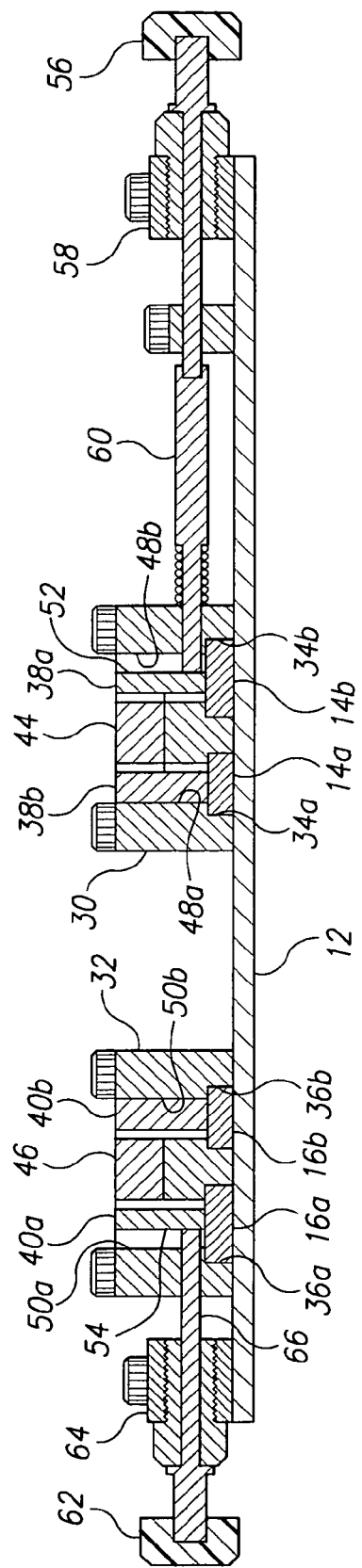
FIG. 3 is a right side elevation view in section of the seat assembly, showing the interrelationship of the various components.

FIG. 1 of the drawings illustrates a first embodiment of the present cycle seat 10 mounted directly upon the seat post P of the frame F of a bicycle B, with FIGS. 2 and 3 illustrating further details of the laterally adjustable side mechanism. The seat 10 includes a base plate 12 upon which the remainder of the mechanism is attached. At least one pair of laterally adjustable extension arms are installed atop the base plate 12, with there preferably being forwardly disposed left and right side thigh extension arms 14a and 14b and rearwardly disposed left and right side hip extension arms 16a and 16b.

Each of the forward or thigh support extension arms 14a, 14b includes a base plate attachment end portion 18a, 18b and an opposite distal or outboard thigh wing or bolster attachment end portion 20a, 20b. The rearward or hip support extension arms 16a, 16b include similar base plate attachment ends 22a and 22b, with opposite distal or outboard hip wing or bolster attachment end portions 24a and 24b. Left and right side thigh support wings or bolsters 26a and 26b attach to the respective thigh wing or bolster attachment end portions 20a and 20b of the forward extension arms 14a, 14b, with left and right side hip support wings or bolsters 28a and 28b attaching to the hip wing or bolster attachment end portions 24a, 24b of the rearward extension arms 16a and 16b. The various bolsters or wings 26a through 28b may be padded or upholstered, as shown along the inboard surfaces of the two left side wings 26a and 28a in FIG. 1.

The various extension arms 14a through 16b are captured upon the base plate by respective forward and rearward guide plates 30 and 32, with the two guide plates 30, 32 extending laterally across the base plate 12 and being attached thereto by appropriate fasteners (cap screws, etc.). Each guide plate 30, 32 includes a pair of underlying extension arm channels, i.e., extension arm channels 34a, 34b for the forward or thigh extension arm guide plate 30 and extension arm channels 36a, 36b for the rearward or hip extension arm guide plate 32. These extension arm channels 34a through 36b are shown in the sectional view of FIG. 3, with the respective extension arms 14a through 16b installed therein.

Each of the extension arms 14a through 16b includes a toothed rack disposed along the inboard or base plate attachment portion thereof. The forward extension arm racks 38a, 38b are shown attached to the base plate attachment portions 18a, 18b of the forward extension arms 14a, 14b, with the rearward racks 40a, 40b being shown separated from their respective base plate attachment portions 22a, 22b of the two rearward extension arms 16a, 16b. The toothed edges or faces 42 of each pair of racks, i.e., the forward rack pair 38a, 38b and the rearward rack pair 40a, 40b face one another, and engage respective forward and rearward pinion gears 44 and 46 disposed therebetween, which, in turn, rotate on shafts affixed within their respective forward and rearward guide plates 30 and 32. Rack clearance slots are provided through the guide plates 30 and 32, i.e., clearance slots 48a, 48b in the forward guide plate 30 for the two racks 38a, 38b of the forward arms 14a and 14b, and slots 50a, 50b in the rearward guide plate 32 for the two racks 40a, 40b of the rearward arms 16a and 16b.

Thus, each extension arm of an extension arm set or pair, e.g., the two forward extension arms 14a, 14b, is forced to move simultaneously with, but opposite to, its opposite arm due to their toothed racks 38a, 38b simultaneously engaging the forward pinion 44. As the pinion 44 rotates e.g., clockwise when viewed from above, both the left and right forward extension arms 14a and 14b are caused to move outwardly simultaneously with one another. Thus, the rider of a cycle equipped with the cycle seat 10 may push or pull either of the two extension arms of an extension arm set, or their corresponding wings or bolsters, e.g., the left front arm 14a and/or its wing 26a, to adjust both wings of the pair or set inwardly or outwardly simultaneously with one another.

The seat 10 with its laterally adjustable side wings or bolsters also includes a locking mechanism for each wing or bolster pair. The forwardly disposed rack of the front extension arm pair and the rearwardly disposed rack of the rear extension arm pair, i.e., racks 38b and 40a, each include detents 52 and 54 along their respective forward and rearward faces, i.e., those faces opposite their toothed faces 42. A forward extension arm locking knob 56 is adjustably secured to the forward portion of the base plate 12 by a block 58, with the knob 56 controlling forward and rearward motion of a detent engaging pin 60 for selective engagement of the detents 52 of the forward rack 38b. A rearward extension arm locking knob 62, retaining block 64, and pin 66 function similarly to the forward knob and pin assembly to selectively engage the detents 54 of the rear rack 40a.

These knobs 56 and 62 are spring-loaded to cause their pins 60 and 66 to engage the corresponding rack detents 52 and 54. When either of these knobs 56 and/or 62 is pulled outwardly, i.e., away from the remainder of the mechanism, the corresponding pin 60 or 66 is withdrawn from the detents 52 or 54 of its respective front or rear rack 38b or 40a, allowing the cyclist to adjust the corresponding front or rear wings or bolsters 26a, 26b or 28a, 28b. The knob mechanisms may be temporarily locked in an outward, i.e., detent disengaged, position against their internal springs by conventional means, e.g., quarter-twist detents or catches, etc., to hold the lock knobs and their pins clear of the rack detents. Suitable lock knobs and pins are manufactured by the Carr-Lane Manufacturing Co. of St. Louis, Mo., and may be used for the detent engagement and locking knobs and pins described above. Alternative mechanisms serving substantially the same function may be substituted.

The cycle seat 68 is immovably affixed atop the base plate 12 and its forward and rearward guide plates 30 and 32, and associated mechanism. The inboard or base plate end portions 18a, 18b and 22a, 22b of the extension arms 14a through 16b are thus captured between the seat 68 and the underlying guide plates 30, 32 and base plate 12. However, they are free to slide inwardly and outwardly beneath the seat 68 and within the corresponding channels 34a through 36b of their guide plates 30 and 32, when the corresponding forward and/or rearward lock knobs 56, 62 are pulled to disengage their pins 60, 66 from the detents 52, 54 of the forward and rearward racks 38b and 40a. This allows the lateral spacing between the forward and rearward wings 26a, 26b and 28a, 28b to be adjusted by the cyclist relative to the seat 68 therebetween.

Figure 4:
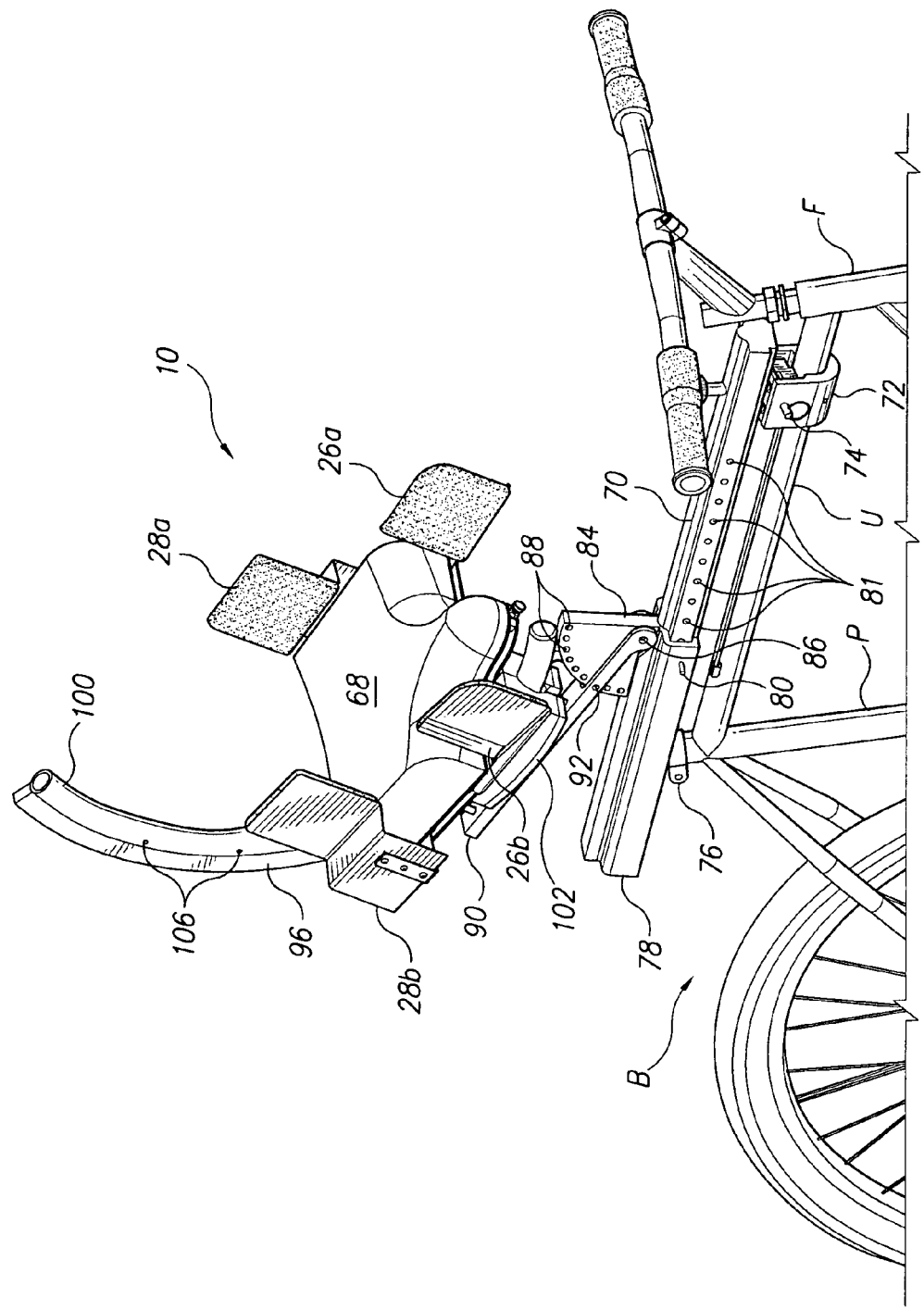
FIG. 4 is a perspective view of an alternative embodiment of the cycle seat, showing its attachment to a longitudinal and arcuate adjustment mechanism on the upper frame of a bicycle.
Figure 5:
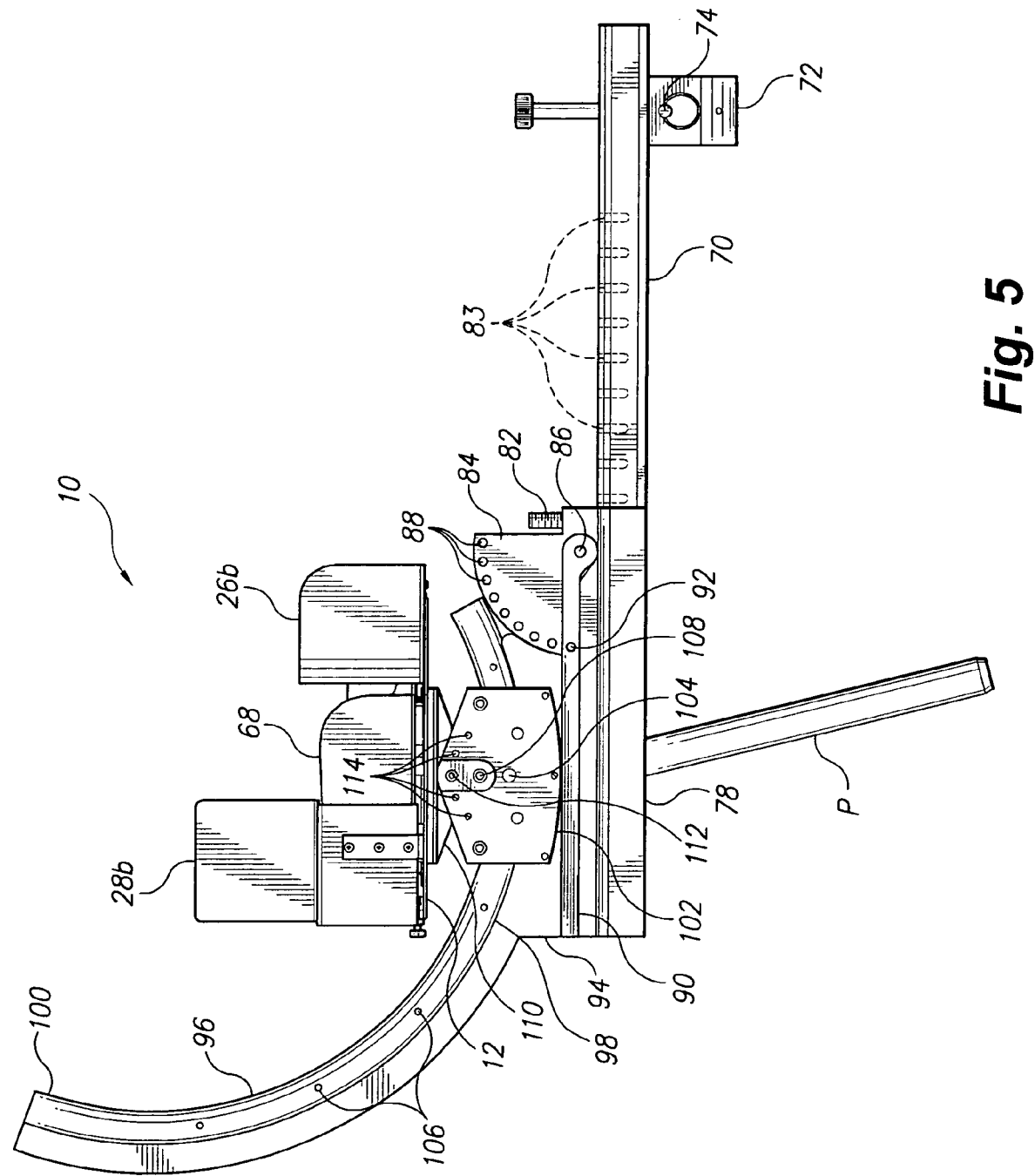
FIG. 5 is a detailed right side elevation view of a slightly modified embodiment of the cycle seat assembly of FIG. 4, showing the seat in its lowermost horizontal position on the adjustment mechanism.
Figure 6:
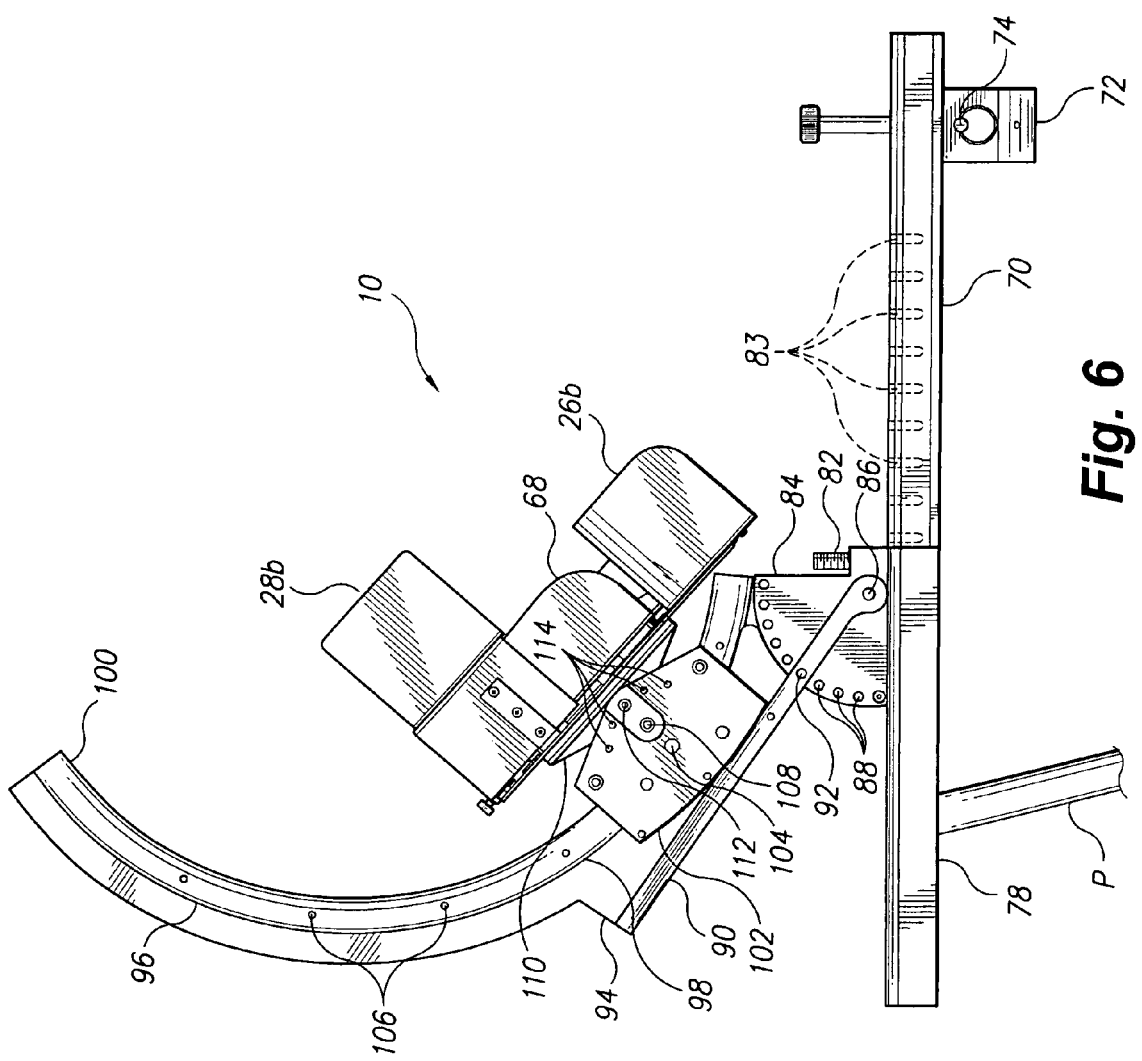
FIG. 6 is a detailed right side elevation view of the embodiment of FIG. 5, showing the seat with the arcuate track raised to adjust the seat position.

FIGS. 4 through 6 illustrate additional seat adjustment mechanisms that may be incorporated in the cycle seat 10, if so desired. The seat adjustment mechanisms of FIGS. 4 through 6 are removably attached to the upper member U of the frame F of a bicycle B, and provide for the longitudinal, arcuate, angular, and/or leveling adjustment of the seat assembly 10 in a plane coplanar with the bicycle frame F. The seat adjustment mechanism of FIGS. 4 through 6 includes a straight, elongate cycle frame attachment rail 70 having a forward end removably secured to the upper member U of the cycle frame F by a bracket 72 and removable attachment pin 74, and an opposite rearward end removably attached to the seat post member P by conventional means, e.g., seat post clamp 76 as shown in FIG. 4.

A seat base support sleeve 78 is slidably and adjustably installed along the attachment rail 70 to provide longitudinal adjustment of the seat assembly 10, with the sleeve 78 being selectively locked in position along the rail 70 by a lateral pin 80 (FIG. 4) or vertical lock pin or screw 82 (FIGS. 5 and 6). Alternatively, the lateral pin or vertical lock screw may be replaced by a conventional electrically actuated solenoid having an electromagnetically actuated pin 80 or 82. In the case of the manually or solenoid actuated lateral pin 80 of FIG. 4, the pin selectively engages one of a series of laterally disposed detents 81 along the side of the cycle frame attachment rail 70. In the case of the manually actuated vertical locking screw or solenoid actuated pin 82 of FIGS. 5 and 6, the screw or pin 82 selectively engages one of a series of vertically disposed detents 83, shown in broken lines in FIGS. 5 and 6 in the frame attachment rail 70.

The sleeve 78 includes an arcuate quadrant plate 84 integrally formed therewith and extending upwardly from the forward end thereof. A pivot pin 86 is removably installed transversely through the arcuate center of the quadrant plate 84, with a series of detent passages 88 being formed through the plate adjacent the periphery thereof. A bifurcated seat track support arm 90 is pivotally secured to the origin of the quadrant plate 84 by the pivot pin 86, and is selectively secured at the desired angle through one of the detent passages by a lock pin 92. Alternatively, the lock pin 92 may be manually actuated, or may be actuated by a conventional electrically-actuated solenoid, in the manner of the alternative solenoids described further above for actuating the pins 80 and/or 82 for locking the position of the seat base support sleeve 78 along the frame attachment rail 70.

A seat assembly support track web 94 extends from the seat track support arm 90, with an arcuate seat assembly support track 96 having a cycle structure attachment portion 98 integrally formed with the web 94 and seat track support arm 90 and an opposite upper distal end 100. A seat assembly attachment trolley 102 travels along the arcuate seat assembly support track 96, and may be selectively locked in position thereon by a trolley position lock pin 104 selectively engaging one of the lock pin passages 106 formed laterally through the arcuate seat assembly support track 96.

Alternatively, the lock pin 104 may be actuated by a conventional electric solenoid, as in the case of the alternative solenoids described further above for actuating the pins 80 and/or 82 for locking the position of the seat base support sleeve 78 along the frame attachment rail 70. The seat base 12 of the seat assembly 10 is pivotally secured to the seat assembly attachment trolley 102 by a leveling pivot 108, which passes through a bracket 110 affixed to the underside of the seat base plate 12. A lateral seat leveling lock pin 112 (or alternatively, another solenoid) selectively engages one of a series of seat leveling pin detents 114 disposed through the side plate of the seat trolley 102 in a semicircular arc about the seat leveling pivot 108, similar to the series of seat arm lock detent passage 88 disposed about the trolley support arm pivot 86 through the arcuate quadrant plate 84.

The above-described seat adjustment mechanism illustrated in FIGS. 4 through 6 is capable of providing both longitudinal adjustment of the seat position along the longitudinal rail 70, and angular, arcuate, and height adjustment of the seat position by means of the angularly adjustable arcuate track 96 and trolley 102. Leveling of the seat assembly 10 with respect to the rail 70 is also provided by tilting the seat assembly 10 with respect to the trolley 102 by means of the seat-leveling lock pin or solenoid 112 and corresponding detents 114 in the seat trolley 102, as discussed further above. However, it will be seen that the adjustment mechanism of the longitudinal rail 70 and its sleeve 78 and adjustment mechanism of the arcuate track 96 and trolley 102 may be separated from one another, if so desired. If purely longitudinal movement of the seat assembly 10 is desired, the seat trolley 102 may be removed from the arcuate seat assembly support track 96, and the longitudinal sleeve 78 removed from its rail 70. The trolley 102 may then be installed directly to the rail 70 by installing the trolley position lock pin 104 through one of the lateral passages of the rail 70. Alternatively, the angular, arcuate, height, and leveling adjustment of the seat assembly 10 may be provided without longitudinal adjustment, by removing the attachment pin 86 of the bifurcated seat track support arm 90 from the quadrant 84, and removing the rail 70 from the upper member U of the bicycle frame F. The seat track support arm 90 may then be reinstalled through the passage of the upper frame previously used to secure the forward end of the rail 70 through the upper member U of the frame F.

Figure 7:
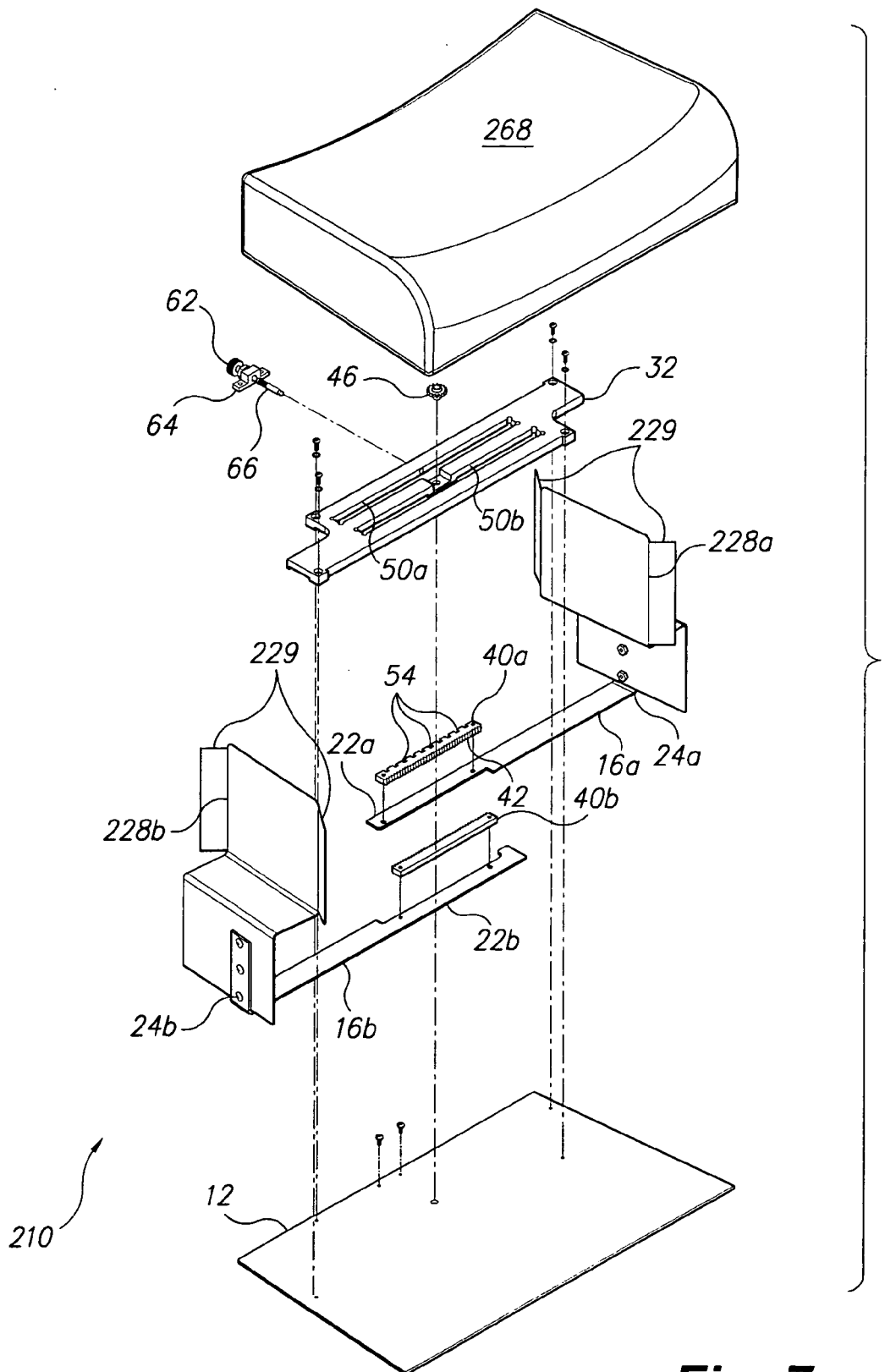
FIG. 7 is an exploded view of an alternative embodiment of a cycle seat with adjustable sides according to the present invention, having only a single set of adjustable sides for cradling the hips.
Figure 8:
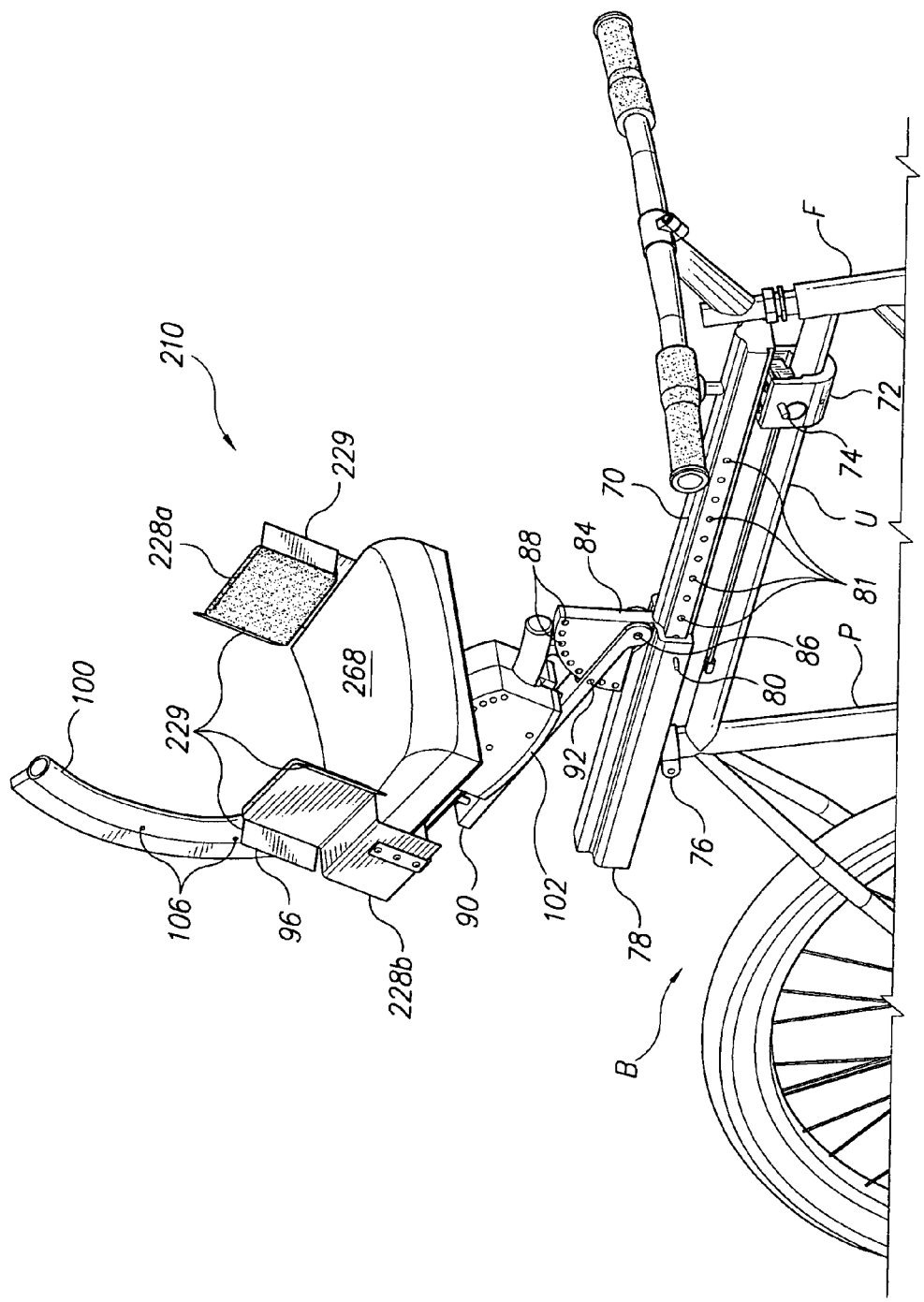
FIG. 8 is a perspective view of the seat of FIG. 7 installed upon the longitudinal and arcuate adjustment assembly of FIG. 5.

FIGS. 7 and 8 illustrate another embodiment of the cycle seat, designated as cycle seat 210. The seat 210 includes only a single laterally adjustable wing pair positioned to cradle the hips. Those components of the seat 210 that are identical to the components of the seat 10 illustrated particularly in FIGS. 2 and 4 of the drawings retain the same reference numerals.

The seat 210 includes a base plate 12 upon which the remainder of the mechanism is attached. At lest one pair of laterally adjustable extension arms are installed atop the base plate 12, preferably with rearwardly disposed left and right side hip extension arms 16a and 16b.

Each of the hip support extension arms 16a, 16b includes a base plate attachment end portion 22a, 22b and an opposite distal or outboard thigh wing or bolster attachment end portion 24a, 24b. Left and right side hip support wings or bolsters 228a and 228b attach to the hip wing or bolster attachment end portions 24a, 24b of the rearward extension arms 16a and 16b. The wings or bolsters 228a, 228b differ from the corresponding components of the embodiment illustrated in FIGS. 1 through 6 due to the angular extension flanges 229 extending forwardly and rearwardly from each wing 228a, 228b. These extension flanges 229 provide some additional rigidity for the wings or bolsters 228a, 228b, and may be incorporated with any of the wings or bolsters 26a, 26b, 28a, and/or 28b of the first embodiment. The bolsters or wings 228b may be padded or upholstered, as shown along the inboard surfaces of the two left side wings 26a and 28a in FIG. 1.

The extension arms 16a and 16b are captured upon the base plate by a guide plate 32. The guide plate 32 may extend laterally across the base plate 12 and be attached thereto by appropriate fasteners (cap screws, etc.). The guide plate 32 includes a pair of underlying extension arm channels 36a, 36b. These extension arm channels 36a through 36b are shown for the rear adjuster assembly in the sectional view of FIG. 3, with the extension arms 16b installed therein.

Each of the extension arms 16b includes a toothed rack disposed along the inboard or base plate attachment portion thereof. The racks 40a, 40b are shown separated from their respective base plate attachment portions 22a, 22b of the two extension arms 16a, 16b. The toothed edges or faces 42 of each rack 40a, 40b face one another, and engage a pinion gear 46 disposed therebetween that in turn rotates on a shaft affixed within the guide plate 32. Rack clearance slots 50a and 50b are provided through the guide plate 32 for the two racks 40a, 40b of the arms 16a and 16b.

Thus, each extension arm of the extension arm set or pair 16a, 16b is forced to move simultaneously with, but opposite to, its opposite arm due to their toothed racks 40a, 40b simultaneously engaging the pinion 46. As the pinion 46 rotates, e.g., clockwise when viewed from above, both the left and right extension arms 16a and 16b are caused to move outwardly simultaneously with one another. Thus, the rider of a cycle equipped with the cycle seat 210 may push or pull either of the two extension arms of an extension arm set, e.g., the left arm 16a and/or its wing or bolster 228a, to adjust both wings of the pair or set inwardly or outwardly simultaneously with one another.

The seat 210 with its laterally adjustable side wings or bolsters also includes a locking mechanism for the wing or bolster pair. The rearwardly disposed rack 40a of the extension arm pair includes detents 54 along its rearward face, i.e., the face opposite the toothed face 42. A rearward extension arm locking knob 62 is adjustably secured to the rearward portion of the base plate 12 by a block 64, with the knob 62 controlling forward and rearward motion of a detent engaging pin 66 for selective engagement of the detents 54 of the rack 40a.

The knob 62 is spring-loaded to cause the pin 66 to engage its rack detent 54. When the knob 62 is pulled outwardly, i.e., away from the remainder of the mechanism, the pin 66 is withdrawn from the detent 54 of its rear rack 40a, allowing the cyclist to adjust the wings or bolsters 28a, 28b. The knob mechanism may be temporarily locked in an outward, i.e., detent disengaged, position against its internal spring by conventional means, e.g., quarter-twist detents or catches, etc., to hold the lock knob and its pin clear of the rack detents. Suitable lock knobs and pins are manufactured by the Carr-Lane Manufacturing Co. of St. Louis, Mo., and may be used for the detent engagement and locking knob and pin described above. Alternative mechanisms serving substantially the same function may be substituted.

The cycle seat 268 is immovably affixed atop the base plate 12 and its guide plate 32, and associated mechanism. The inboard or base plate end portions 22a, 22b of the extension arms 16a and 16b are thus captured between the seat 268 and the underlying guide plate 32 and base plate 12. However, they are free to slide inwardly and outwardly beneath the seat 268 and within the corresponding channels 36a and 36b (as shown for the rear wing or bolster assembly in FIG. 2) of the guide plate 32, when the lock knob 62 is pulled to disengage its pin 66 from the detent 54 of the rack 40a. This allows the lateral spacing between the wings 228a and 228b to be adjusted by the cyclist relative to the seat 268 therebetween.

FIGS. 9 through 13 illustrate another embodiment for an articulating seat support arm assembly 310. The seat support arm assembly of FIGS. 9 through 13 attaches to the diagonal down tube D of a conventional bicycle frame F, and pivots angularly therefrom to support the seat assembly (e.g., the seat assembly 210 of FIGS. 7 and 8, or perhaps other seat assembly 10 as shown in FIGS. 1 through 6) thereon.

A diagonal frame member attachment bracket 312 is affixed to the diagonal down tube D of the cycle frame F, and provides for the pivotal attachment of the seat support arm assembly 310 therefrom. The bracket 312 may comprise a pair of opposed clamping members that are secured to one another by a plurality of bolts and capture the down tube D therebetween, thus allowing the bracket 312 to be removed from the cycle frame F or adjustably repositioned along the diagonal down tube D of the frame F if desired. The bracket 312 includes a pair of lugs or bosses 314 (shown in broken lines in FIGS. 9, 10, and 13) through which a pivot shaft 316 (shown in broken lines in those Figs.) passes.

Figure 11:
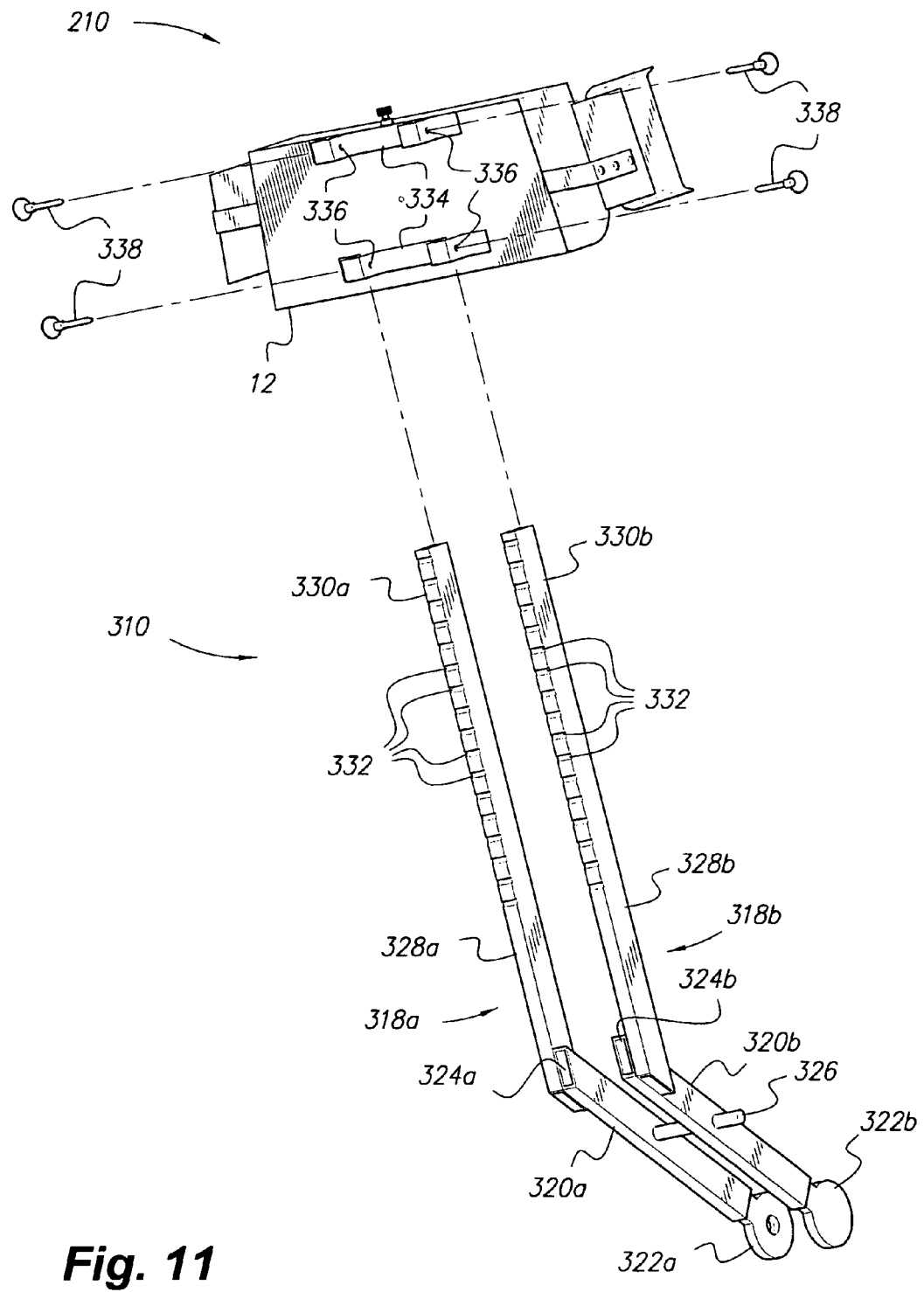
FIG. 11 is an exploded rear perspective view of the seat support arm and seat mounting bracket for the cycle seat with adjustable sides of FIG. 9, showing various details thereof.
Figure 13:
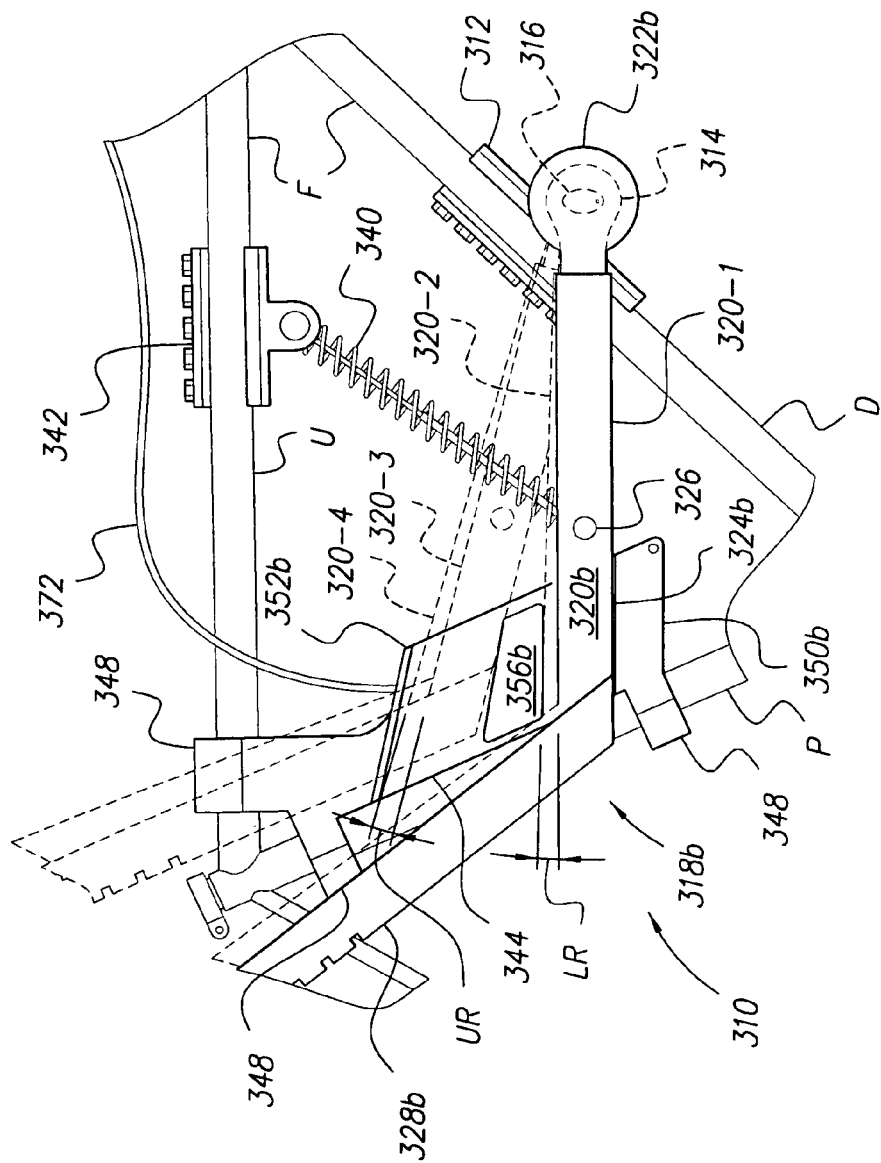
FIG. 13 is a right side elevation view of the articulating seat support arm for the cycle seat with adjustable sides of FIG. 9, showing its various positions.

The seat support arm assembly 310 is shown in greater detail in FIGS. 11 and 13. The arm assembly 310 includes mutually parallel left and right seat support arms, respectively 318a and 318b, that pivot from the bracket 312 and adjustably support the cycle seat assembly, e.g., seat assembly 210, thereon. Each of the arms 318a, 318b includes a lower member, respectively 320a and 320b, with each of the lower members having a bracket attachment end, respectively 322a and 322b, and an opposite upper member attachment end, respectively 324a and 324b. The two lower members 320a, 320b are immovably affixed to one another and held in a parallel relationship by a connector 326 extending laterally therebetween. The bracket attachment ends 322a, 322b of the lower members are affixed to the pivot shaft 316 that passes through the lugs or bosses 314 of the diagonal frame member attachment bracket 312, with this assembly allowing the seat support arm assembly 310 to pivot about its attachment to the cycle frame F by means of the bracket 312.

Each of the lower members 320a, 320b has an upper member, respectively 328a and 328b, that extends from the upper member attachment end 324a, 324b of the respective lower member. Each of the upper members 328a, 328b has a distal seat attachment portion, respectively 330a and 330b, having a series of seat latch notches 332 formed thereacross. The upper members 328a, 328b form an obtuse angle A with their respective lower members 320a, 320b to provide greater clearance beneath the rider and to support the seat assembly 210 at the proper angle relative to the rider, as shown most clearly in FIGS. 9 and 10.

The base plate 12 of the seat 268 (or other seat configuration, as desired) includes a pair of brackets 334 shaped or configured to fit closely about the two upper members 328a, 328b of the articulating seat support arm assembly 310, as shown most clearly in FIG. 11. Each of the brackets 334 includes a pair of lateral passages 336 through the portions thereof that fit closely about the upper members 328a, 328b of the arm assembly 310, with the lateral passages 336 aligning closely with selected ones of the notches 332 when the seat assembly 210 (or other cooperating seat assembly) is installed on the arm assembly 310. A corresponding series of quick release pins 338 installs removably through the seat bottom bracket passages 336, and engages the corresponding notches 332 to lock the seat assembly 210 in position as desired along the arm assembly 310. Thus, the rider may remove the pins 338, slide the seat assembly 210 upwardly or downwardly along the upper members 328a, 328b of the arm assembly 310 to position the seat assembly 210 as desired, and reinsert the pins 338 to lock the seat assembly 210 in the new position.

Figure 9:
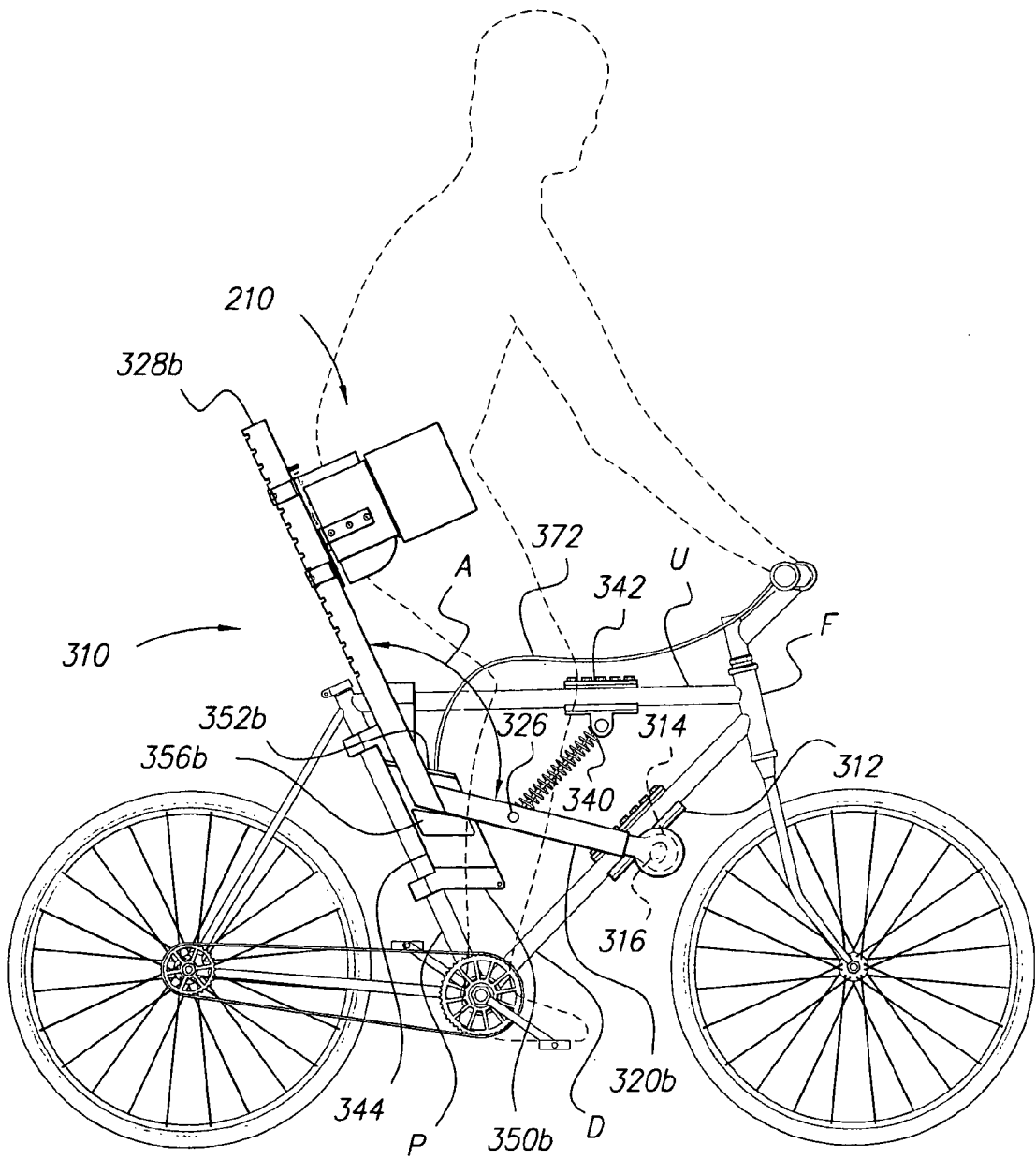
FIG. 9 is a right side elevation view of another alternative embodiment of a cycle seat with adjustable sides according to the present invention, shown mounted upon an arcuately articulating support arm, with the seat and arm shown in their uppermost positions.
Figure 10:
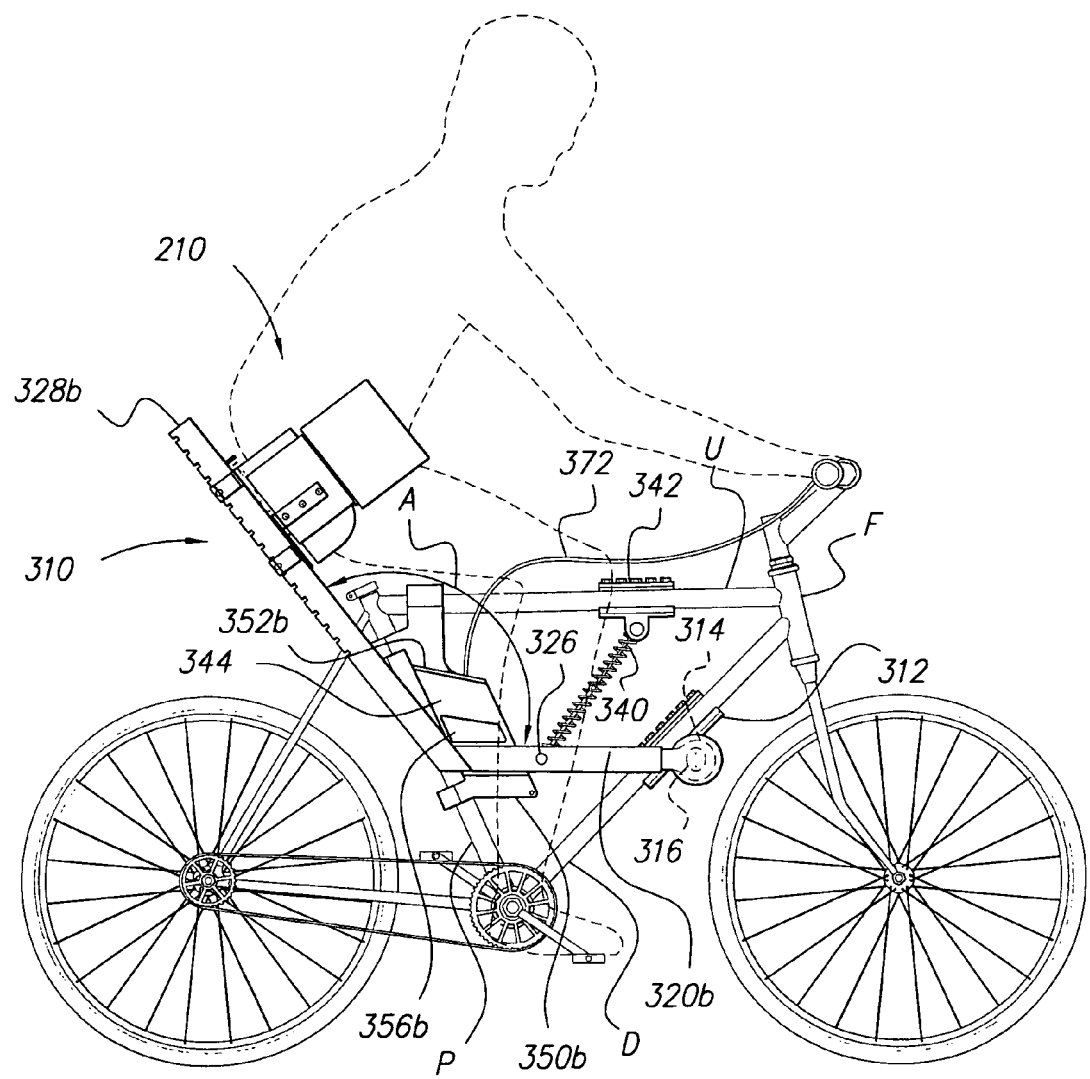
FIG. 10 is a right side elevation view of the seat and arcuately articulating support arm of the cycle seat with adjustable sides of FIG. 9, with the seat and arm shown in their lowermost positions.

Additional mechanisms are provided to control and limit the movement of the seat support arm assembly 310, and thus the seat assembly 210, as shown in FIGS. 9, 10, and 13. The arm assembly 310 is urged or biased upwardly, i.e., toward the rider when the cycle is being operated, by a tension spring 340. The frame attachment end of the spring 340 is secured to an upper tube attachment bracket 342, the bracket 342 comprising two opposed clamp members that bolt together and capture the upper tube U of the cycle frame therebetween, in the manner of the diagonal frame member clamp 312. The opposite end of the spring 340 connects to the lateral connector 326 that connects the two lower members 320a, 320b of the seat support arm assembly 310 together. The upper tube attachment bracket 342 may be positioned as desired along the length of the upper tube or frame member U. If greater lifting force for the seat support arm assembly 310 and seat assembly 210 is desired, the bracket 342 may be moved farther forward along the upper frame member or tube U, or moved farther rearwardly to reduce the lifting force of the spring 340.

Figure 12:
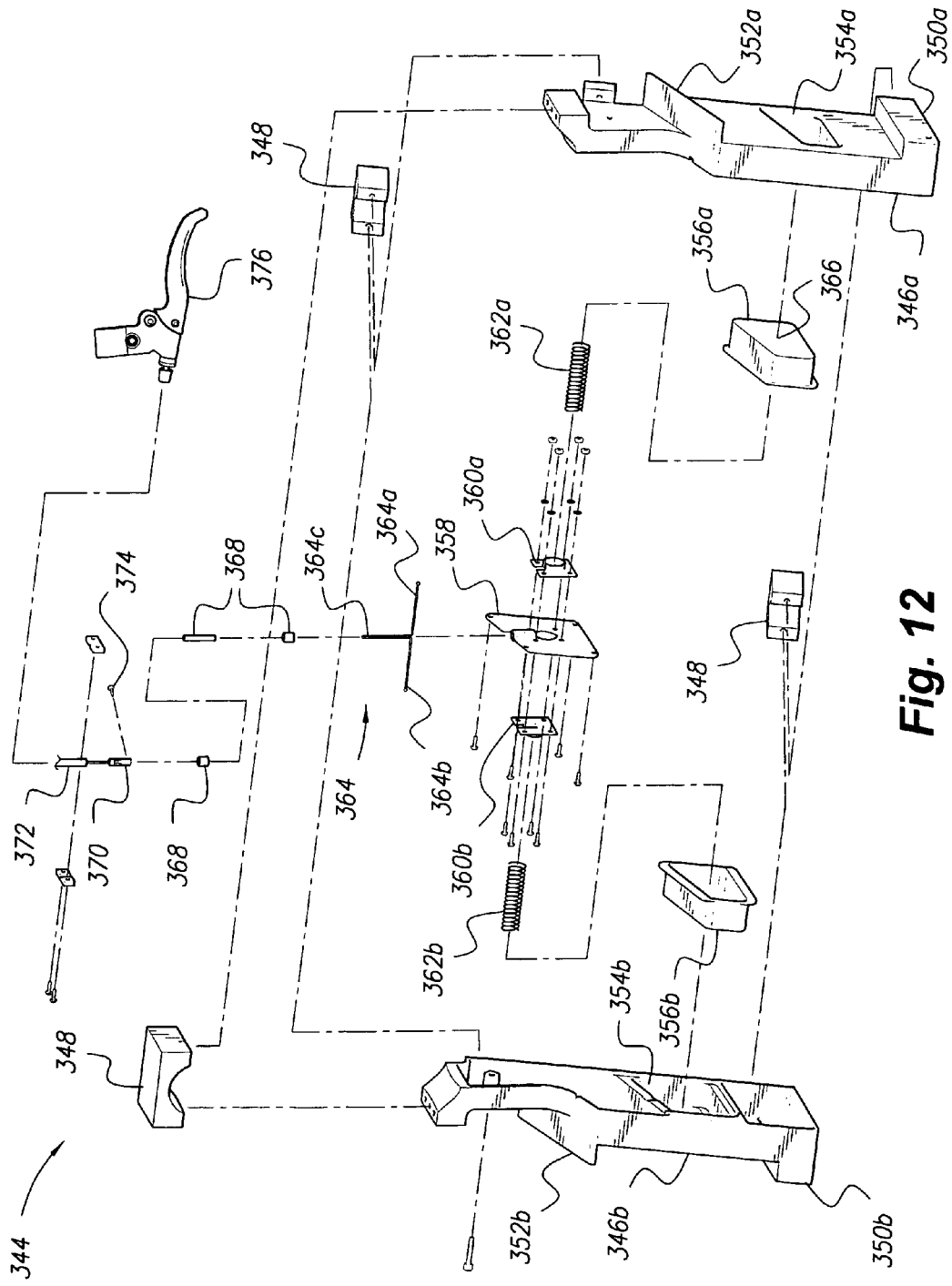
FIG. 12 is an exploded perspective view of the latch mechanism for securing the seat support arm for the cycle seat with adjustable sides of FIG. 9 as desired, showing various details thereof.

Upward and downward movement of the seat support arm assembly 310, and thus the seat 210, is limited by a seat support arm latch mechanism 344, shown most clearly in FIGS. 12 and 13. The latch mechanism 344 comprises left and right latch housing halves, respectively 346a and 346b, that secure to one another to form the housing containing the various components forming the arm assembly latch mechanism 344. A series of attachment blocks 348 secure to the rear and upper edges of the latch housing 346a, 346b to clamp the mechanism 344 to the upper frame member U and seat post frame member P, as shown in FIG. 13.

Each housing half 346a, 346b includes a lower seat arm stop or flange, respectively 350a and 350b, and an opposite upper seat arm stop or flange, respectively 352a and 352b. Each housing half further includes a latch passage, respectively 354a and 354b, therein, with corresponding latches 356a, 356b installed therein. A central plate 358 is installed within the housing assembly 346a, 346b, with the plate 358 providing attachment for a pair of laterally opposed spring seats 360a, 360b. The spring seats in turn seat laterally opposed latch extension springs 362a, 362b, with the two springs bearing compressively against the inner surfaces of their respective latches 356a, 356b and urging or biasing the latches 356a and 356b to an outwardly extended orientation.

Latch retraction means is provided to pull the two latches 356a, 356b into their respective housing halves 346a, 346b to allow the lower members 320a and 320b of the seat support arm assembly 310 to transition between the lower and upper limits of arm travel defined by the seat support arm latch mechanism 344. A latch retraction tension member 364 (e.g., flexible cord, etc.) has distal ends 364a, 364b that pass through the two springs 362a, 362b and through small passages 366 through the outer faces of the two latches 356a and 356b. The opposing tips of this retraction member 364 are knotted or otherwise formed to prevent their being pulled back through the passages 366 of the latches 356a and 356b. The central portion 364c is doubled upon itself to form a loop or bight.

The loop or bight portion 364c of the tensile latch retraction member 364 is passed through one or more ferrules, sleeves, and guides 368 captured within or extending from the central plate 358, and into a connector 370 at the end of a control member 372, where it is secured by a keeper 374 (e.g., cotter pin, etc.) that passes through the connector 370 and the bight of the central portion 364c of the retraction member 364. The control member 372 may comprise a conventional elongate, flexible bicycle brake cable and housing, with the distal end of the cable and housing 372 connecting to a conventional handlebar mounted grip lever 376 to control the retraction and extension of the two latches 356a, 356b.

FIG. 13 provides a more detailed view of the operation of the latch mechanism 344, illustrating the right side of the seat support arm assembly 310 in its installation in the cycle frame F. The latch mechanism 344 defines two separate arcuate ranges of motion for the seat support arm assembly 310, or more specifically for the lower members, e.g., the lower member 320b shown in FIG. 13, of the arm assembly 310. A lower range of arcuate motion is defined between the lower arm stop flange 350b and the latch 356b when the latches are extended, with an upper range of arcuate motion being defined between the extended latch 356b and the upper arm stop flange 352b of the mechanism 344.

It will be noted that the lower range of arcuate motion LR as indicated by the two positions 320-1 and 320-2 of the arm lower member 320b, is somewhat less than the upper range of arcuate motion UR as shown in broken lines by the two positions 320-3 and 320-4 of the arm lower member 320b. Preferably, the lower arcuate range of motion LR of the lower members 320a, 320b is on the order of about one degree, while the upper arcuate range of motion UR permits about five degrees of free play between the latch 356a or 356b and the corresponding upper flange or stop 352a or 352b. These ranges of arcuate motion may be adjusted as desired, or the two latches 356a, 356b may be held in a retracted state if so desired to allow the lower members 320a, 320b of the seat support arm assembly 310 to travel arcuately through its full range between the lower stops or flanges 350a, 350b and the opposite upper stops or flanges 352a, 352b of the seat support arm latch mechanism 344, if so desired.

The lower range of arcuate motion LR restricts the seat support arm assembly 310 to a relatively low position, with the seat assembly 210 (or other seat assembly, as desired) traveling accordingly. This position is used when the cyclist is riding at a moderate, steady pace over reasonably level ground, i.e., the cyclist does not need to exert him or herself greatly. The cyclist can thus assume a generally seated position on the seat assembly 210, generally as shown in FIG. 10 of the drawings. The slight one degree (more or less) of play provided in the lower range LR of arcuate motion allows the seat support arm assembly 310 to be drawn to its upper limit against the overlying extended latches 356a, 356b by the spring 340, against the weight of the cyclist. However, the slight play provided in this lower range LR of arcuate motion allows the two lower members 320a, 320b to move slightly according to the force imparted by the cyclist or rider, thus cushioning the cyclist when traversing somewhat rough or uneven terrain.

When the cyclist wishes to exert greater force on the pedals, as during acceleration or when traveling uphill, he or she will raise himself or herself to a more standing position, generally as shown in FIG. 9 of the drawings. Preferably, the seat assembly 210 is also raised in order to continue to provide both rear and lateral support for the cyclist. This is accomplished by operating the actuating or grip lever 376 (shown in FIG. 12) to pull the cable 372, thus drawing the two distal portions 364a, 364b of the tensile latch retraction member 364 inwardly to retract the two latches 356a, 356b. The cyclist may then stand on the pedals, with the spring 340 raising the two lower members 320a, 320b of the seat support arm assembly 310 upwardly against the upper stops or flanges 352a, 352b of the latch mechanism 344. The cyclist then releases the lever 376 to allow the latches 356a, 356b to extend by means of the compressive extension springs 262a, 362b, thus locking the seat support arm assembly 310 in its upper range of motion UR. This upper range of motion UR assures that the seat assembly 210 will remain in contact with the cyclist as he or she moves during the pedaling of the cycle, thus providing the desired rearward and lateral leverage or bracing to assist the cyclist or rider.

In conclusion, the cycle seat 10, with its laterally adjustable bolsters or wings and various adjustments provided by the additional mechanisms shown in FIGS. 4 through 6 and 9 through 13, provides a multitude of seating configurations for the cyclist. The provision of laterally-adjustable wings or bolsters for the thighs and/or hips of the cyclist allows the cyclist to apply lateral thrust for controlling the balance of the cycle by means of the thigh and/or hip wings of the seat, with the lateral adjustment of the wings allowing cyclists of widely differing body builds to make use of the same seat mechanism. It will be seen that the cycle seat 10 in its various embodiments may be incorporated into virtually any practicable type of pedal-powered cycle, regardless of the number of wheels or seats the cycle may have. This seat mechanism with its laterally adjustable bolsters or wings, particularly in combination with the other adjustment mechanisms described herein, serve to greatly facilitate the comfort and control of the cyclist, particularly during strenuous riding conditions.

It is to be understood that the present invention is not limited to the embodiments described above, but encompasses any and all embodiments within the scope of the following claims.

We claim:

1. A cycle seat with adjustable sides, comprising:
   a diagonal frame member attachment bracket;
   a seat support arm assembly pivotally extending from the diagonal frame member attachment bracket, the assembly having mutually parallel left and right seat support arms, each of the arms having:
      a lower member having a bracket attachment end and an upper member attachment end opposite the bracket attachment end; and
      an upper member extending from the upper member attachment end of the lower member, the upper member having a distal seat assembly attachment portion, the lower member and the upper member defining an obtuse angle therebetween;
   a connector disposed between each of the lower members, the connector immovably affixing the lower members together; and
   a cycle seat assembly adjustably disposed upon the upper member of each of the arms, wherein the cycle seat assembly further comprises:
      a base plate;
      at least one pair of left and right extension arms disposed atop the base plate, each of the extension arms having a base plate attachment portion and a distal wing attachment end opposite the base plate attachment portion, each of the extension arms being in mutually cooperating lateral adjustment with one another;
      a lateral support wing extending upwardly from the distal end of each of the extension arms; and
      a seat disposed atop the base plate, the base plate attachment portion of each of the extension arms being captured between the seat and the base plate.

2. The cycle seat with adjustable sides according to claim 1, further comprising:
   an upper tube attachment bracket;
   a tension spring disposed between the upper tube attachment bracket and the seat support arm assembly, the tension spring urging the seat support arm assembly upward; and
   a seat support arm latch mechanism adjustably cooperating with the seat support arm assembly.

3. The cycle seat with adjustable sides according to claim 2, wherein the seat support arm latch mechanism further comprises:
   a latch housing;
   a left latch and a right latch each laterally retractably disposed within the latch housing, the left latch and the right latch being mutually opposed to one another;
   a left latch extension spring and a right latch extension spring respectively urging the left latch and the right latch outwardly from the latch housing;
   a tensile latch retraction member connecting the left latch and the right latch to one another; and
   a tensile control member connected generally medially to the latch retraction member.

4. The cycle seat with adjustable sides according to claim 3, wherein the tensile control member comprises an elongate flexible cable having a distal end, the cycle seat with adjustable sides further comprising a handgrip lever controllably connected to the distal end of the cable.

5. The cycle seat with adjustable sides according to claim 3, wherein:
   the latch housing further includes upper left, upper right, lower left, and lower right stops; and
   the left latch and the right latch are disposed between the respective upper and lower stops of the latch housing, each latch defining a lower seat support arm range between the respective lower stop and latch, each latch further defining an upper seat support arm range between the respective upper stop and latch.

6. A cycle seat with adjustable sides, comprising:
   a diagonal frame member attachment bracket;
   a seat support arm assembly pivotally extending from the diagonal frame member attachment bracket;
   a cycle seat assembly adjustably disposed upon the seat support arm assembly;
   an upper tube attachment bracket;
   a tension spring disposed between the upper tube attachment bracket and the seat support arm assembly, the tension spring urging the seat support arm assembly upwardly; and
   a seat support arm latch mechanism adjustably cooperating with the seat support arm assembly, wherein the seat support arm latch mechanism further comprises:
      a latch housing;
      a left latch and a right latch each laterally retractably disposed within the latch housing, the left latch and the right latch being mutually opposed to one another;
      a left latch extension spring and aright latch extension spring respectively urging the left latch and the right latch outwardly from the latch housing;

a tensile latch retraction member connecting the left latch and the right latch to one another; and a tensile control member connected generally medially to the latch retraction member.

7. The cycle seat with adjustable sides according to claim 6, wherein the cycle seat assembly further comprises:

a base plate;

at least one pair of left and right extension arms disposed atop the base plate, each of the extension arms having a base plate attachment portion and a distal wing attachment end opposite the base plate attachment portion, each of the extension arms being in mutually cooperating lateral adjustment with one another;

a lateral support wing extending upwardly from the distal end of each of the extension arms; and a seat disposed atop the base plate, the base plate attachment portion of each of the extension arms being captured between the seat and the base plate.

8. The cycle seat with adjustable sides according to claim 6 wherein the seat support arm assembly further includes mutually parallel left and right seat support arms, each of the arms comprising:

a lower member having a bracket attachment end and an upper member attachment end opposite the bracket attachment end;

an upper member extending from the upper member attachment end of the lower member, the upper member having a distal seat assembly attachment portion, the lower member and the upper member defining an obtuse angle therebetween; and a connector disposed between each of the lower members, the connector immovably affixing the lower members together.

9. The cycle seat with adjustable sides according to claim 6, wherein the tensile control member comprises an elongate flexible cable having a distal end, the cycle seat with adjustable sides further comprising a handgrip lever controllably connected to the distal end of the cable.

10. The cycle seat with adjustable sides according to claim 6, wherein:

the latch housing further includes upper left, upper right, lower left, and lower right stops; and the left latch and the right latch are disposed between the respective upper and lower stops of the latch housing, each latch defining a lower seat support aim range between the respective lower stop and latch, each latch further defining an upper seat support arm range between the respective upper stop and latch.

11. A cycle seat with adjustable sides, comprising:

a diagonal frame member attachment bracket;

a seat support arm assembly pivotally extending from the diagonal frame member attachment bracket;

a cycle seat assembly adjustably disposed upon the seat support arm assembly, the cycle seat assembly comprising:

a base plate;

at least one pair of left and right extension arms disposed atop the base plate, each of the extension arms having a base plate attachment portion and a distal wing attachment end opposite the base plate attachment portion, each of the extension arms being in mutually cooperating lateral adjustment with one another;

a lateral support wing extending upwardly from the distal end of each of the extension arms; and a seat disposed atop the base plate, the base plate attachment portion of each of the extension arms being captured between the seat and the base plate.

12. The cycle seat with adjustable sides according to claim 11 wherein the seat support arm assembly further includes mutually parallel left and right seat support arms, each of the arms comprising:

a lower member having a bracket attachment end and an upper member attachment end opposite the bracket attachment end;

an upper member extending from the upper member attachment end of the lower member, the upper member having a distal seat assembly attachment portion, the lower member and the upper member defining an obtuse angle therebetween; and a connector disposed between each of the lower members, the connector immovably affixing the lower members together.

13. The cycle seat with adjustable sides according to claim 11, further comprising:

an upper tube attachment bracket;

a tension spring disposed between the upper tube attachment bracket and the seat support arm assembly, the tension spring urging the seat support arm assembly upwardly; and a seat support arm latch mechanism adjustably cooperating with the seat support arm assembly.

14. The cycle seat with adjustable sides according to claim 13, wherein the seat support arm latch mechanism further comprises:

a latch housing;

a left latch and a right latch each laterally retractably disposed within the latch housing, the left latch and the right latch being mutually opposed to one another;

a left latch extension spring and a right latch extension spring respectively urging the left latch and the right latch outwardly from the latch housing;

a tensile latch retraction member connecting the left latch and the right latch to one another; and a tensile control member connected generally medially to the latch retraction member.

15. The cycle seat with adjustable sides according to claim 14, wherein the tensile control member comprises an elongate flexible cable having a distal end, the cycle seat with adjustable sides further comprising a handgrip lever controllably connected to the distal end of the cable.

16. The cycle seat with adjustable sides according to claim 14 wherein:

the latch housing further includes upper left, upper right, lower left, and lower right stops; and the left latch and the right latch are disposed between the respective upper and lower stops of the latch housing, each latch defining a lower seat support arm range between the respective lower stop and latch, each latch further defining an upper seat support arm range between the respective upper stop and latch.

* * * * *